No. 898,262. PATENTED SEPT. 8, 1908.
A. F. RENKEN.
GOPHER TRAP.
APPLICATION FILED MAY 25, 1908.
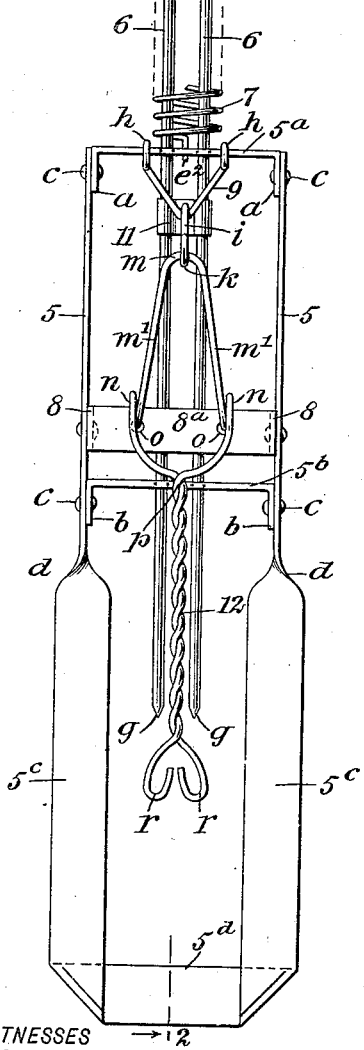
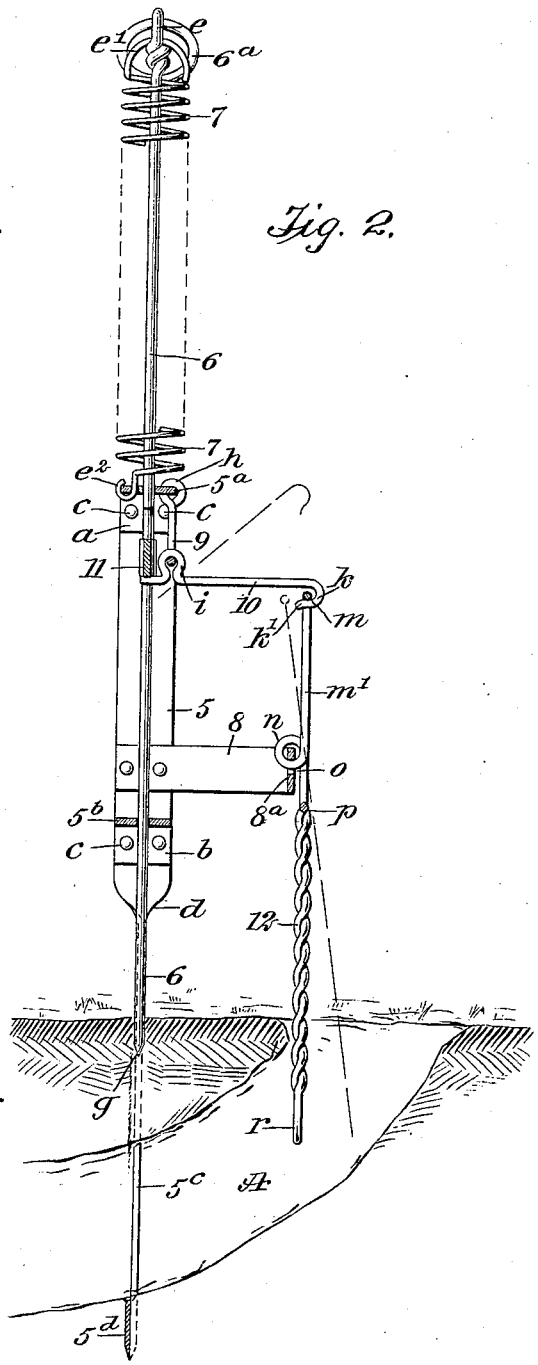
WITNESSES
INVENTOR
Anton F. Renken
BY
ATTORNEYS

UNITED STATES PATENT OFFICE.

ANTON F. RENKEN, OF KRAMER, NEBRASKA.

GOPHER-TRAP.

No. 898,262.　　　Specification of Letters Patent.　　　Patented Sept. 8, 1908.

Application filed May 25, 1908. Serial No. 434,747.

*To all whom it may concern:*

Be it known that I, ANTON F. RENKEN, a citizen of the United States, and a resident of Kramer, in the county of Lancaster and State of Nebraska, have invented a new and improved Gopher-Trap, of which the following is a full, clear, and exact description.

The purpose of this invention is to provide novel features of construction for a gopher trap, that afford a simple, practical and inexpensive device of the character indicated, and which is adapted for killing the rodent in its burrow.

The invention consists in the novel construction and combination of parts, as is hereinafter described, and defined in the appended claims.

Reference is to be had to the accompanying drawings forming a part of this specification, in which similar characters of reference indicate corresponding parts in both views.

Figure 1 is a front elevational view of the improved trap having its working parts adjusted for service, and Fig. 2 is a partly sectional side view of the trap substantially on the line 2—2 in Fig. 1.

The frame, provided for the support of the working parts in relative positions, is preferably formed of strips of plate metal, consisting of two side pieces 5—5, that are spaced apart, parallel with each other, by a top cross piece $5^a$, and a similar cross piece $5^b$, that is near the lower ends of the frame members 5, said cross pieces having flanges $a$, $b$ respectively formed on the ends thereof, and secured in place by rivets $c$.

At $d$, $d$, the frame members 5 are each twisted so as to give them one-fourth of a revolution, and from these twists the frame members 5 are extended, providing extension members $5^c$ that are joined together at their lower ends by a cross piece $5^d$.

A stabbing fork is provided, comprising two limbs 6, 6 formed of a single wire rod, bent at the center of its length, and then given a single rotative twist, thus producing a ring eye $e$ at the junction of the spaced limbs, the latter being parallel with each other and of a suitable length for effective service. On said ring eye, a handle ring $6^a$ is mounted, and affords convenient means for manually adjusting the stabbing fork. The limbs 6, 6, of the stabbing fork, are slidably engaged in spaced perforations formed in the cross pieces $5^a$ and $5^b$, at such points as will locate the fork at the transverse center of the frame and parallel with the frame members $5^a$, and as shown the lower free ends $g$ of the fork limbs or tines 6, are pointed to adapt them for penetrating the body of a gopher. A coiled spring 7 is extended between the ring-eye $e$ and the center of the cross piece $5^a$, to which the ends of said spring are respectively secured, as shown at $e'$ and $e^2$ in Fig. 1. Upon the frame members 5, 5, a short distance above the cross piece $5^b$, two arms 8, 8, of a looped frame are secured near their ends, said arms having suitable length and projecting forwardly, being joined together at their front ends by a cross bar $8^a$. In spaced perforations formed in the cross piece $5^a$ equally distant from the flanges $a$, the looped ends $h$ of a bail-shaped hanger 9, preferably formed of wire rod, are loosely secured. On the bail-like hanger 9, at its looped center, a trigger bar 10 is loosely secured, the bar having a closable ring $i$ formed thereon near one end thereof, which receives the hanger. A cross bar 11 is secured by its ends on the spaced limbs 6, 6, of the stabbing fork, and as indicated in Fig. 2 the end portion of the trigger bar 10, near the ring $i$, may be placed in engagement with the lower edge of the cross bar 11, which will support the trigger bar projected outwardly in a horizontal plane. An open hook $k$ is formed on the outer end of the trigger bar 10, the nib end $k'$ of said hook inclining slightly downward.

A tripping bar 12 is a completing detail of the trap, and essentially consists of a single wire rod, bent into loop form at its center, as shown at $m$ in Fig. 1, the two equal portions $m'$ that extend from said loop each having a ring coil $n$ formed therein, at an equal distance from the center of the loop $m$.

In the cross bar $8^a$, two spaced perforations $o$ are formed, into which the ring coils $n$ are respectively inserted, thus loosely connecting them with the cross bar. From the ring coils $n$, the equal members of the wire rod are curved downward and toward each other, and from their point of intersection $p$, these members are twisted together forming the body of the tripping bar 12.

Upon each of the twisted members of the tripping bar 12, at their free ends, a hook $r$ is formed, these hooks affording a widened abutment on the lower end of the tripping bar.

In arranging the trap for use, the lower portion of the trap frame comprising the members $5^c$ and $6^d$ is forced down into the ground so as to straddle the burrow A of a gopher near the open end of said burrow. The insertion of the frame members into the soil will also insert the stabbing fork bars 6, 6 down through the burrow A, and dispose the tripping bar 12, at or near the open end of the burrow, as shown in Fig. 2. The trap is now set by drawing the stabbing fork bars 6 upward against the stress of the spring 7, that is thus expanded, and when the cross bar 11 is sufficiently elevated, the end of the short member of the trigger bar 10 is placed beneath and in contact with the lower edge of said cross bar 11. The looped end $m$ of the tripping bar 12 is now engaged with the nib end $k'$ on the outer end of the trigger bar 10, which completes the setting of the trap.

It is to be understood that the trap is placed in position for service, when it is known a gopher is occupying the burrow A.

The burrowing gopher lives on succulent roots of clover, or other herbage, and forms its subterranean passage for the purpose of feeding on such roots, which usually grow in bunches or clumps, and such rodents seldom leave their burrows. When the trap is set in the position shown in Fig. 2, the disturbance of the soil near the mouth of the burrow alarms the rodent, and as is the habit of such animals the gopher sets to work packing ground at the mouth of the burrow for its closure, and the pressure of the earth against the lower end of the tripping bar 12 will release the trigger bar 10 and permit the spring 7 to force the stabbing fork members 6 down through the gopher, killing it. It may be that the gopher will endeavor to leave its burrow, so that by its contact with the tripping bar the latter will be swung outward, as indicated by broken lines in Fig. 2, and the trap be sprung, killing the rodent.

Having thus described my invention, I claim as new and desire to secure by Letters Patent:

1. The combination with a frame consisting of side members and cross bars, a stabbing fork comprising spaced parallel tines pointed at their free ends and provided with a ring at their connected ends, the cross bars having perforations through which the tines slide, a spring connected with the ring and with one of the cross bars, a laterally projecting frame having a cross bar at its outer end, a trigger bar on a cross bar of the main frame, the tines being provided with a cross bar for engagement by the inner end of of the trigger bar, a hook on the outer end of the trigger bar, and a tripping bar pivoted on the lateral frame and having a looped upper end for engagement by the trigger bar.

2. The combination with a frame formed of plate metal, and consisting of two spaced parallel side members, cross bars arranged between the side members and provided with perforations, a stabbing fork formed of a single wire rod bent at its center and formed into a ring, thus producing two spaced fork tines that are parallel with each other, said tines being pointed at their free ends and slidable through said perforations in the frame cross bars, and a coiled spring connected at its ends respectively with the ring on the upper end of the stabbing fork and the upper cross bar of the frame, said spring being expanded by an upward sliding movement of the stabbing fork, of a cross bar connecting the tines of the stabbing fork, a laterally projected frame on the main frame and having a flat cross bar at its outer end, a trigger bar loosely hung from the upper cross bar of the main frame near the inner end of said trigger bar, said end being adapted for engaging the cross bar on the fork tines, a hook formed on the outer end of the trigger bar, and a tripping bar hung on the outer member of the lateral frame, and having a looped upper end that may be engaged with the hook on the trigger bar.

In testimony whereof I have signed my name to this specification in the presence of two subscribing witnesses.

ANTON F. RENKEN.

Witnesses:
JOSEPH KLEIN
PAUL BECK.